No. 875,042. PATENTED DEC. 31, 1907.
E. J. BISSELL.
WAVE MOTOR.
APPLICATION FILED MAY 21, 1906.
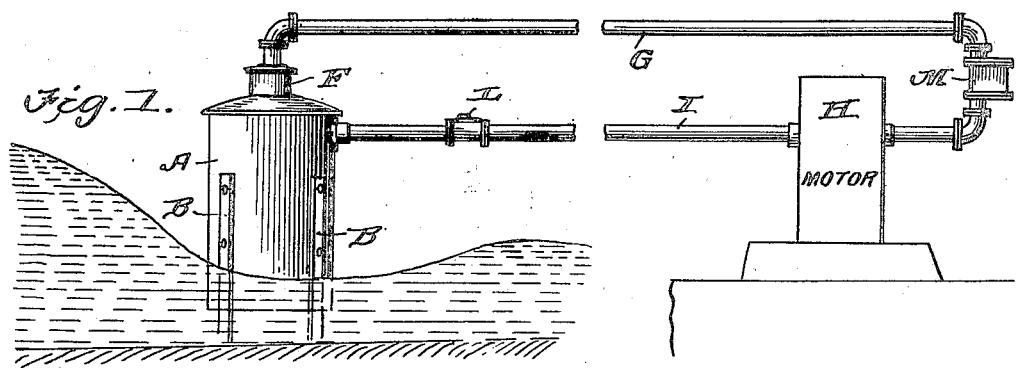
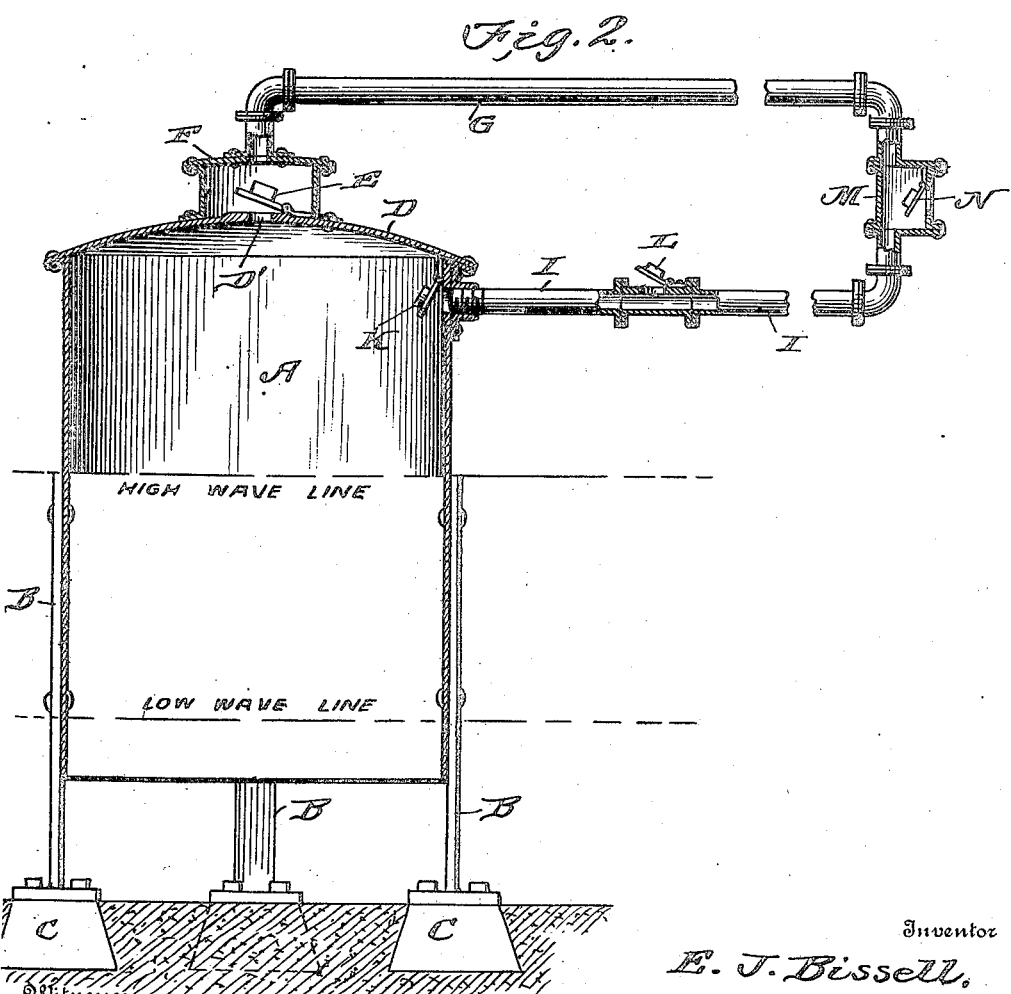

UNITED STATES PATENT OFFICE.

EDWARD J. BISSELL, OF BAY CITY, MICHIGAN.

WAVE-MOTOR.

No. 875,042.

Specification of Letters Patent.

Patented Dec. 31, 1907.

Application filed May 21, 1906. Serial No. 318,056.

*To all whom it may concern:*

Be it known that I, EDWARD J. BISSELL, a citizen of the United States, residing at Bay City, in the county of Bay and State of Michigan, have invented a new and useful Improvement in Wave-Motors, of which the following is a specification.

This invention relates generally to wave motors and more particularly to one in which the rise and fall of the water in wave motion is utilized for the purpose of moving or forcing the air for the purpose of transmitting motion or producing power.

The object of my invention is to construct a wave motor operating upon this principle, which shall be exceedingly simple and durable and highly efficient in operation.

Another object of the invention is to so construct the wave motor that not only the compression force of the air will act upon the mechanical motor but the exhaustive force utilized upon the opposite side thereof.

Another object of the invention is to provide suitable safety appliances for the purpose of preventing choking and supplying the tank with all needed air.

With these various objects in view, my invention consists essentially in arranging a tank in the water, said tank being of any suitable size or shape, closed on all sides and also at the top but open at the bottom, the top portion of the tank extending above the normal crest line of the waves and the bottom of the tank extending below the normal trough line of the waves, the top of the tank being provided with an outwardly opening valve, an air pipe leading from the top of the tank and a return pipe leading into the side of the tank adjacent its upper end, the tank being provided with an inwardly opening valve at the inner end of the return pipe.

The invention consists also in certain details of construction, and novelties of combination all of which will be fully described hereinafter and pointed out in the claims.

In the drawings forming a part of the specification, Figure 1 is a diagrammatic elevation illustrating the practical operation of my invention. Fig. 2 is a vertical sectional view partly in elevation, the mechanical motor being omitted.

In the practical embodiment of my invention I employ a tank A, which may be of any suitable size or shape, said tank being supported upon standards B, which are firmly connected to foundations C. The tank is closed at its upper end by means of the top D which has a central valve opening D' over which seats the valve E and a valve chest F is securely bolted to the top of the tank and has the air pipe G leading therefrom. The upper end of the tank is arranged above the normal crest line of the waves and the open end of the tank is arranged below the normal trough line of the waves and it will be understood that as the water rises, a portion of air contained in the tank between the water and the top of tank will be forced through the valve opening and out through the pipe G as the water rises in the tank, the force with which the air is moved being equal to the force of the water which is approximately the weight of said water, rising within the tank. The air thus forced from the tank is introduced into a motor H and the said air acting upon this motor will drive the same in a manner well known in the operation of compressed air motors, and the pipe I which leads from exhaust end of the motor is carried back into the tank A adjacent the upper end of the same and discharges the air which passes through the motor into the tank for the purpose of replenishing the partial vacuum which would occur upon the fall of the water within the tank.

An inwardly opening valve K, closes the end of the pipe I, as the water rises but opens inwardly as soon as the water begins to recede. Thus it will be seen that upon each upward movement of the water, the valve E is forced upwardly and the air is forced from the tank out through the pipe G to the motor H and then upon its downward movement is drawn through the pipe I back to the tank, thereby replenishing the tank with air, and it will be noted that not only the compressive or moving forces of the air is employed, but also the exhaustive or drawing force of the falling wave is also exerted upon the motor as the suction through the pipe I produced by the fall of the water will increase the effectiveness of the compressed air upon the motor equal to the weight of the falling wave.

The apparatus which I have shown and described is one unit which may be multiplied as desired by simply coupling together the desired number of units and all of the compressed air can be led to one place of utilization or to any desired number of places of utilization but the essential points of construction and operation remain substantially the same.

In order to guard against undue compression and a consequent choking of the apparatus, I provide an upwardly opening relief valve L, in the pipe I, between the motor and tank, said valve discharging into the outer air so that if because of the still rising wave in the tank or for any other reason the valve K should fail to operate this valve L opening and discharging into the air would permit the apparatus to continue its operation and if for any reason the air supply in the tank should become so exhausted as to require additional air, I provide for the same by interposing a valve chest M, between the valve E and motor H and arrange an inwardly opening valve N, so that if additional air is quickly needed in the tank A, this valve will open as soon as the driven air in the pipe G, is overcome by the suction of the pipe I, and the air will rush in and pass through the pipe I into said tank. It will thus be seen that I effectively provide against undue compression and exhaustion.

While I have shown the tank A as rigidly secured to the standards B it is obvious that this tank can be made adjustable in order to accommodate the tank to the height of the water at high and low tide if such a condition be desired.

Having thus fully described my invention, what I claim as new and desire to secure by Letters Patent, is:—

1. A wave motor comprising a tank open at the bottom, closed at the top, the upper end of the tank being provided with an outwardly opening valve, an air pipe leading from the said upper end of the tank and a return pipe leading into the tank adjacent its upper end an inwardly opening valve arranged at the inner end of said return pipe means for admitting additional air, and means for liberating air from said air pipes.

2. A wave motor comprising a tank open at the bottom, closed at the top, said top having an outwardly opening valve, a pipe leading from said upper end, a motor into which said pipe leads, an exhaust pipe leading from the motor back to the air tank at a point adjacent the upper end, a relief valve in said pipe and an inwardly opening valve arranged at the inner end to said return pipe.

3. A wave motor comprising a tank open at the bottom and closed at the top, said tank being so arranged that its upper end is above the normal crest line of the wave, and its lower end below the normal trough line of the wave, the top of the tank having an outwardly opening valve, an air pipe leading from said upper end, a valve therein, a motor into which the said pipe leads, an exhaust pipe leading from the motor back into the air tank at a point adjacent the upper end of said tank, a relief valve in said pipe and an inwardly opening valve arranged at the end of said pipe.

4. A wave motor comprising a tank open at the bottom, closed at the top and having an outwardly opening valve, an air pipe leading from said upper end, a motor to which the said pipe leads, a return pipe leading from the motor to the air tank and having an inwardly opening valve, at its inner end, a safety outlet valve arranged between the motor and tank and an emergency inlet valve arranged between the tank and motor as set forth.

5. A device of the kind described consisting of a downwardly open tank partially submerged, an air pipe, said air pipe having communication at each end with said tank, an air motor arranged in said air pipe, means for admitting additional air other than that in the tank to said air pipes, means for liberating surplus air from said pipes, air being forced through said air motor upon rise of water in the tank and sucked through the motor upon fall of water in the tank, the air passing through the motor at all times in one direction.

EDWARD J. BISSELL.

Witnesses:
 CHAS. E. BROCK,
 E. B. McBATH.